(12) United States Patent
Chen

(10) Patent No.: US 11,489,953 B2
(45) Date of Patent: Nov. 1, 2022

(54) PERSONNEL CONTACT HISTORY RECORDING METHOD, ELECTRONIC DEVICE AND COMPUTER PROGRAM PRODUCT

(71) Applicant: Shenzhen Fugui Precision Ind. Co., Ltd., Shenzhen (CN)

(72) Inventor: Wei-Hung Chen, New Taipei (TW)

(73) Assignee: Shenzhen Fugui Precision Ind. Co., Ltd., Shenzhen (CN)

( * ) Notice: Subject to any disclaimer, the term of this patent is extended or adjusted under 35 U.S.C. 154(b) by 118 days.

(21) Appl. No.: 17/025,402

(22) Filed: Sep. 18, 2020

(65) Prior Publication Data

US 2022/0094774 A1 Mar. 24, 2022

(51) Int. Cl.
*H04M 1/2757* (2020.01)
*H04M 1/27453* (2020.01)
*H04M 1/275* (2006.01)
*H04W 4/80* (2018.01)

(52) U.S. Cl.
CPC ......... *H04M 1/2757* (2020.01); *H04M 1/275* (2013.01); *H04M 1/27453* (2020.01); *H04W 4/80* (2018.02)

(58) Field of Classification Search
CPC ........... H04M 1/2757; H04M 1/27453; H04M 1/275; H04M 2250/60; H04M 1/72412; H04M 2250/02; H04W 4/80; H04W 8/005

USPC .......... 455/41.1–41.2, 404.1, 414.1
See application file for complete search history.

(56) References Cited

U.S. PATENT DOCUMENTS

| 9,245,433 B1* | 1/2016 | Butler | G08B 13/00 |
| 2018/0052970 A1* | 2/2018 | Boss | G06F 21/35 |
| 2021/0345068 A1* | 11/2021 | Husted | H04B 1/385 |

FOREIGN PATENT DOCUMENTS

| TW | 201719475 A | 6/2017 |
| TW | I621371 B | 4/2018 |

* cited by examiner

*Primary Examiner* — Michael Y Mapa
(74) *Attorney, Agent, or Firm* — ScienBiziP, P.C.

(57) ABSTRACT

A personnel contact history recording method executable by an electronic device, comprising: scanning surrounding devices via Bluetooth by a preset time interval; requesting a device name and an IMSI of the scanned device, when at least one device is scanned, and generating a surrounding phone list according to the scanned devices; comparing the surrounding phone list with a daily list to determine whether the devices recording in the surrounding phone list are recorded in the daily list; and, if at least one device recording in the surrounding phone list is recorded in the daily list, sending a warning message to the electronic device and a server.

11 Claims, 5 Drawing Sheets

PERSONNEL CONTACT HISTORY RECORDING METHOD, ELECTRONIC DEVICE AND COMPUTER PROGRAM PRODUCT

BACKGROUND

1. Technical Field

The disclosure relates to mobile devices, and more particularly to a personnel contact history recording method for an electronic device and a computer program product using the method.

2. Description of Related Art

The recent outbreak of COVID-19 virus has been severe. To prevent the epidemic from spreading, if a person is infected or is likely to be infected, it is necessary to confirm the route, location and contact history where the person has traveled recently, so as to find a possible source or possibility of infected people.

At preset, routes and locations of the infected people and the potentially infected people can be traced, and, dates and locations may be announced to the public.

The method to confirm whether any person has visited the locations is to locate a suspected infected person via a base station and send a text message to people around the person at the same time. However, an error range of this method is too large to confirm whether the person contact any other people.

BRIEF DESCRIPTION OF THE DRAWINGS

Many aspects of the preset disclosure can be better understood with reference to the following figures. The components in the figures are not necessarily drawn to scale, the emphasis instead being placed upon clearly illustrating the principles of the preset disclosure. Moreover, in the drawings, like reference numerals designate corresponding parts throughout the several views. Implementations of the preset technology will now be described, by way of embodiments, with reference to the attached figures, wherein.

DETAILED DESCRIPTION

Figure 1:
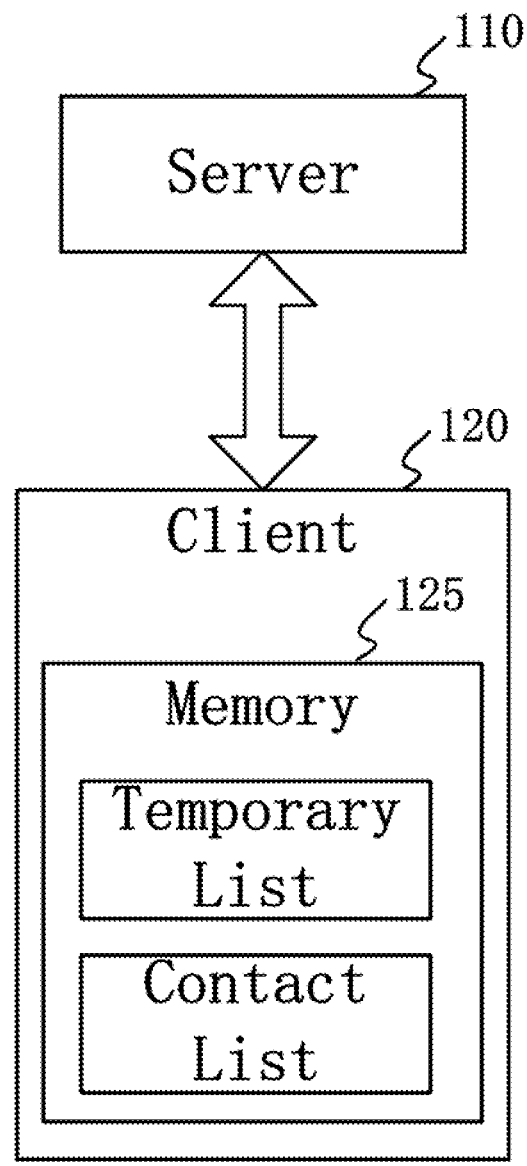
FIG. 1 is a schematic diagram of an embodiment of a personnel contact history recording system of the preset disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the preset disclosure.

Several definitions that apply throughout this disclosure will now be preseted.

The term "comprising," when utilized, means "including, but not necessarily limited to"; it specifically indicates open-ended inclusion or membership in the so-described combination, group, series, and the like.

FIG. 1 is a schematic diagram of an embodiment of a personnel contact history recording system of the preset disclosure.

The embodiment of the personnel contact history recording system at least comprises a server 110, such as a command center, and a client 120, such as a mobile phone.

The server 110 sends a quarantine daily list (D-List) to the client 120 every day and defines priorities of persons in the D-List according to degrees of danger, comprising confirmed, home isolation and contacted.

The client 120 provides two lists, comprising a temporary list (T-List) and a contact list (C-List) which are stored in a memory 125 of the client 120. The T-List stores a Bluetooth scan list currently scanned by the client 120. The Bluetooth scan list comprises two fields, comprising International Mobile Subscriber Identity (IMSI) and a number to be scanned (NUM). The C-List stores an IMSI with a NUM greater than a preset value N, indicating that a person having a mobile phone providing the IMSI is scanned with the NUM greater than the preset value N.

Figure 2:
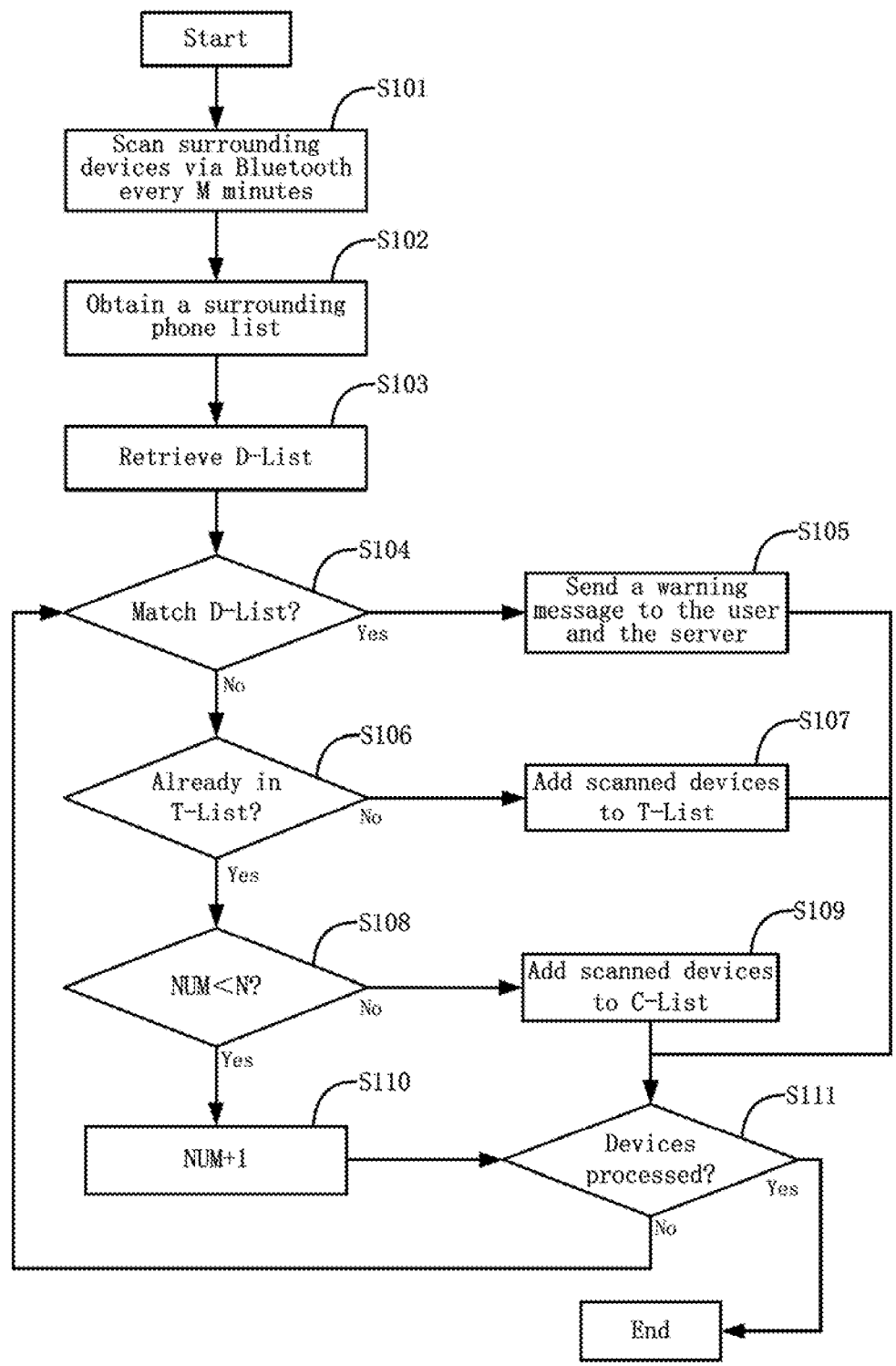
FIG. 2 is a flowchart of an embodiment of a personnel contact history recording method of the preset disclosure.

FIG. 2 is a flowchart of an embodiment of a personnel contact history recording method, applied in an electronic device, of the preset disclosure. The order of the steps in the flowchart can be changed and some steps can be omitted according to different requirements.

In block S101, the mobile phone (the client 120) scans surrounding devices via Bluetooth every M minutes.

In block S102, as at least one device is scanned, a device name and an IMSI of the scanned device are requested. If the scanned device is provided with the IMSI, indicating the scanned device is equipped with a subscriber identity module (SIM) card, the scanned device should be a mobile phone. When the scanning process is terminated, mobile phones having weak received signal strength indication (RSSI) signals and scanned devices without the IMSI are filtered, thereby obtaining a surrounding phone list recording mobile phones nearer the client 120.

In block S103, a D-List is retrieved from the server 110. The server 110 sends the D-List to the mobile phone (the client 120) every day.

Figure 3:
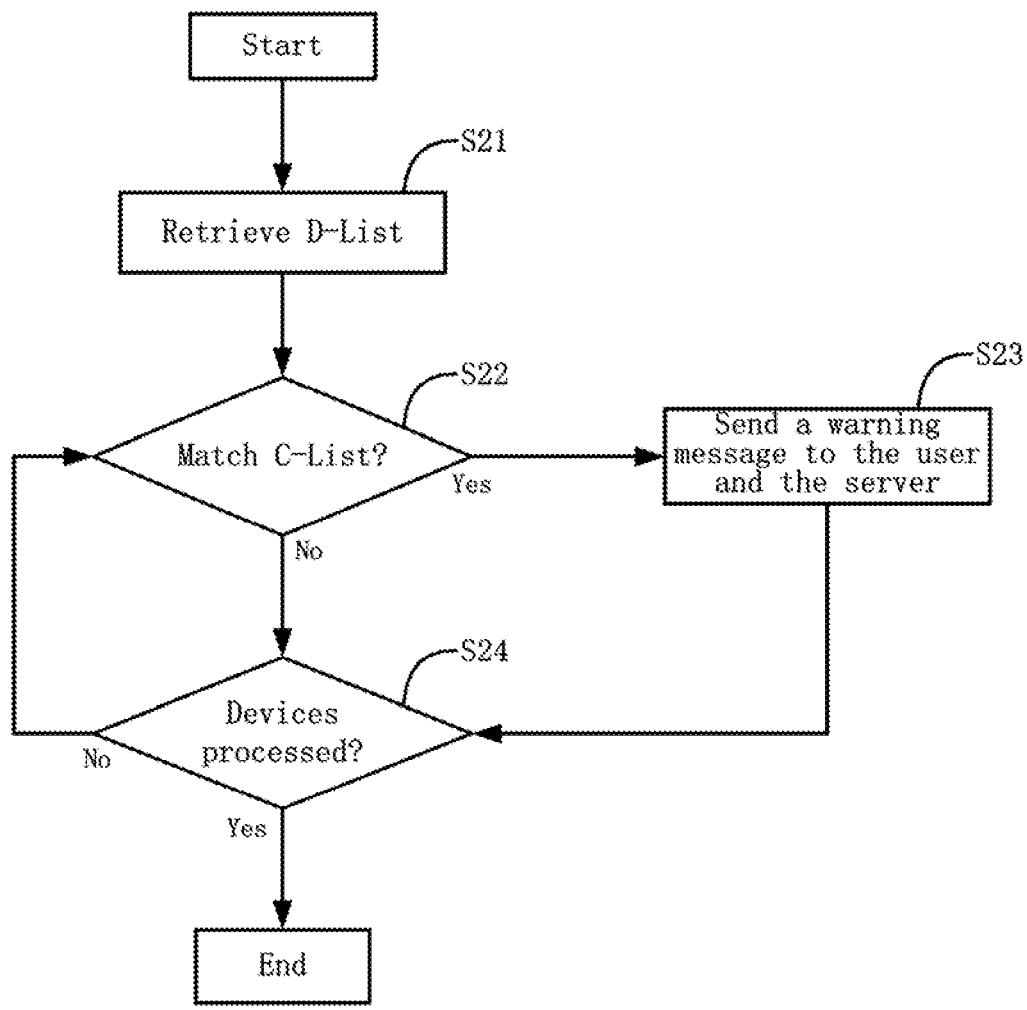
FIG. 3 is a flowchart of an embodiment of a personnel contact history recording method of the preset disclosure.

FIG. 3 is a flowchart of an embodiment of sending, updating and comparing the D-List with the C-List of the preset disclosure.

In block S21, the mobile phone (the client 120) retrieves the D-List from the server 110 every day.

In block S22, the mobile phone (the client 120) retrieves and compares the D-List with the C-List stored in the memory of the mobile phone to determine whether a device belonging to a person is matched.

In block S23, if a device belonging to a person is matched, indicating that the user belonging to the client 120 contact at least a person having the device recorded in the D-List, a warning message is sent to the user and the server 110 which means the user have a contact history.

In block S24, it is determined whether the comparison between the D-List and the C-List is completed, and, if so, the process is terminated, and, if not, the process proceeds to the step S22.

In block S104, the surrounding phone list is compared with the D-List to determine whether the devices recording in the surrounding phone list are recorded in the D-List.

In block S105, if at least one device recording in the surrounding phone list is recorded in the D-List, a warning message is sent to the user belonging to the client 120 and the server 110 which means the user have a contact history.

In block S106, if no device recording in the surrounding phone list is recorded in the D-List, the surrounding phone list is compared with the T-List to determine whether the devices recording in the surrounding phone list are recorded in the T-List.

In block S107, if no device recording in the surrounding phone list is recorded in the T-List, indicating that the device is first scanned, the IMSI of the scanned device is stored in the T-List.

In block S108, if at least one device recording in the surrounding phone list is recorded in the T-List, it is determined whether the NUM of the scanned device is less than the preset value N indicating the lowest scanned times (NUM<N?).

In block S109, if the NUM is not less than the preset value N, the scanned device is recorded in the C-List.

In block S110, if the NUM is less than the preset value N, the NUM of the scanned device is added by 1 (NUM+1).

In block S111, it is determined whether the scanned devices recorded in the surrounding phone list have been completed processed, and, if so, the process is terminated, and, if not, the process proceeds to step S16 to process another scanned device.

Figure 4:
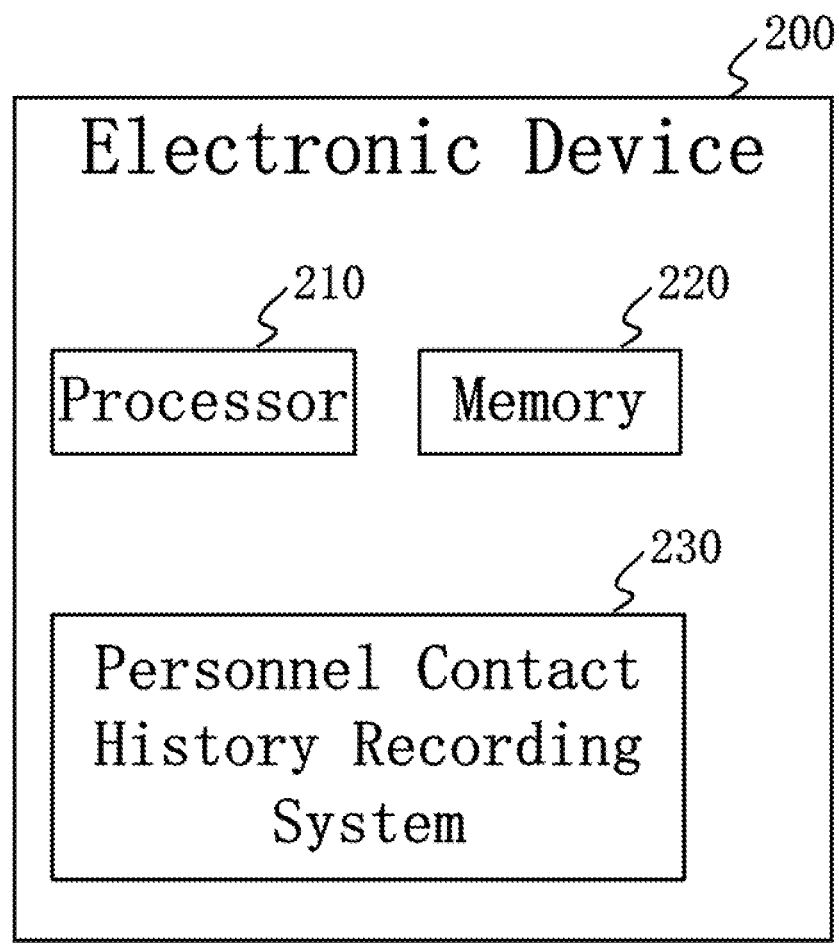
FIG. 4 is a block diagram of an embodiment of the hardware architecture of an electronic device using the method of the preset disclosure.

FIG. 4 is a block diagram of an embodiment of the hardware architecture of an electronic device using the personnel contact history recording method of the preset disclosure. The electronic device 200 may, but is not limited to, connect to a processor 210, a memory 220, and a personnel contact history recording system 230 via system buses. The electronic device 200 shown in FIG. 4 may include more or fewer components than those illustrated, or may combine certain components.

The memory 220 stores a computer program, such as the personnel contact history recording system 230, which is executable by the processor 210. When the processor 210 executes the personnel contact history recording system 230, the blocks in one embodiment of the personnel contact history recording method applied in the electronic device 200 are implemented, such as blocks S101 to S111 shown in FIG. 2.

It will be understood by those skilled in the art that FIG. 4 is merely an example of the electronic device 200 and does not constitute a limitation to the electronic device 200. The electronic device 200 may include more or fewer components than those illustrated, or may combine certain components. The electronic device 200 may also include input and output devices, network access devices, buses, and the like.

The processor 210 may be a central processing unit (CPU), or other general-purpose processors, a digital signal processor (DSP), an application specific integrated circuit (ASIC), a Field-Programmable Gate Array (FPGA), or another programmable logic device, discrete gate or transistor logic device, discrete hardware components, or the like. The processor 210 may be a microprocessor or other processor known in the art.

The memory 220 can be used to store the personnel contact history recording system 230 and/or modules/units by running or executing computer programs and/or modules/units stored in the memory 220. The memory 220 may include a storage program area and a storage data area. In addition, the memory 220 may include a high-speed random access memory, a non-volatile memory such as a hard disk, a plug-in hard disk, a smart memory card (SMC), and a secure digital (SD) card, flash card, at least one disk storage device, flash device, or other volatile solid state storage device.

The personnel contact history recording system 230 can be partitioned into one or more modules/units that are stored in the memory 220 and executed by the processor 210. The one or more modules/units may be a series of computer program instructions capable of performing particular functions of the personnel contact history recording system 230.

Figure 5:
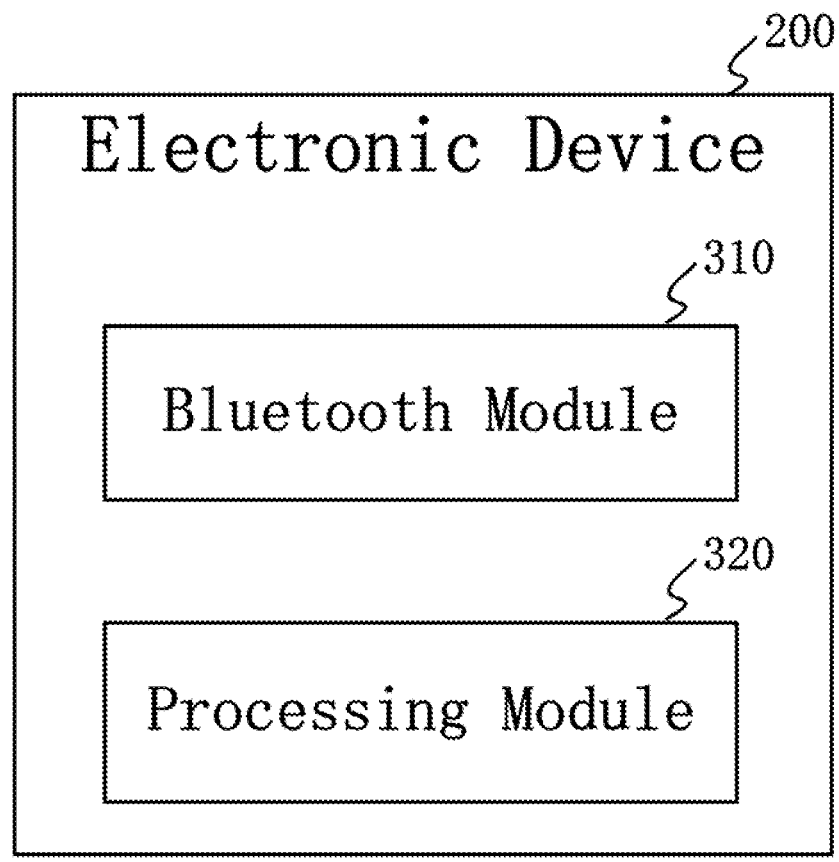
FIG. 5 is a schematic diagram of functional blocks of the electronic device using the method according to an embodiment of the preset disclosure.

FIG. 5 is a schematic diagram of an embodiment of functional blocks of the electronic device using the method of the preset disclosure.

The electronic device 200, such as a mobile phone, comprises a Bluetooth module 310 and a processing module 320.

The Bluetooth module 310 scans surrounding devices via Bluetooth every M minutes. As at least one device is scanned, a device name and an IMSI of the scanned device are requested. If the scanned device is provided with the IMSI, indicating the scanned device is equipped with a subscriber identity module (SIM) card, the scanned device should be a mobile phone. When the scanning process is terminated, mobile phones having weak received signal strength indication (RSSI) signals and scanned devices without the IMSI are filtered, thereby obtaining a surrounding phone list recording mobile phones nearer the client 120.

The processing module 320 retrieves a D-List from the server 110. The server 110 sends the D-List to the mobile phone (the client 120) every day. The processing module 320 compares the D-List with the C-List stored in the memory of the mobile phone to determine whether a device belonging to a person is matched. If a device belonging to a person is matched, indicating that the user belonging to the client 120 contact at least a person having the device recorded in the D-List, the processing module 320 sends a warning message to the user and the server 110 which means the user have a contact history.

The processing module 320 determines whether the comparison between the D-List and the C-List is completed. If the comparison between the D-List and the C-List is completed.

The processing module 320 compares the surrounding phone list with the D-List to determine whether the devices recording in the surrounding phone list are recorded in the D-List, and, if at least one device recording in the surrounding phone list is recorded in the D-List, sends a warning message to the user belonging to the client 120 and the server 110 which means the user have a contact history.

If no device recording in the surrounding phone list is recorded in the D-List, the processing module 320 compares the surrounding phone list with the T-List to determine whether the devices recording in the surrounding phone list are recorded in the T-List. If no device recording in the surrounding phone list is recorded in the T-List, indicating that the device is first scanned, the IMSI of the scanned device is stored in the T-List. If at least one device recording in the surrounding phone list is recorded in the T-List, the processing module 320 determines whether the NUM of the scanned device is less than the preset value N indicating the lowest scanned times (NUM<N?).

The processing module 320, if the NUM is not less than the preset value N, records the scanned device in the C-List, if the NUM is less than the preset value N, adds the NUM of the scanned device by 1 (NUM+1), and, determines whether the scanned devices recorded in the surrounding phone list have been completed processed. If the scanned devices recorded in the surrounding phone list have been completed processed, the process is terminated, and, if not, another scanned device is then processed.

It is to be understood, however, that even though numerous characteristics and advantages of the preset disclosure have been set forth in the foregoing description, together with details of the structure and function of the preset disclosure, the disclosure is illustrative only, and changes may be made in detail, especially in matters of shape, size, and arrangement of parts within the principles of the preset disclosure to the full extent indicated by the broad general meaning of the terms in which the appended claims are expressed.

What is claimed is:

1. A personnel contact history recording method executable by an electronic device, comprising:
   scanning surrounding devices via Bluetooth by a preset time interval;
   in response that a device is scanned, requesting a device name and an International Mobile Subscriber Identity (IMSI) of the scanned device, and generating a surrounding phone list according to the scanned device;
   comparing the surrounding phone list with a daily list to determine whether the scanned device recording in the surrounding phone list is recorded in the daily list;
   when the scanned device recording in the surrounding phone list is recorded in the daily list, sending a warning message to the electronic device and a server;
   when the scanned device recording in the surrounding phone list is not recorded in the daily list, comparing the surrounding phone list with a temporary list to determine whether the scanned device recording in the surrounding phone list is recorded in the temporary list; and
   when the scanned device recording in the surrounding phone list is not recorded in the temporary list, storing the IMSI of the scanned device in the temporary list.

2. The method of claim 1, further comprising:
   when the scanned device recording in the surrounding phone list is recorded in the temporary list, determining whether a scanned number of the scanned device is less than a preset value N indicating the lowest scanned times;
   when the scanned number is not less than the preset value N, recording the scanned device in a contact list; and
   when the scanned number is less than the preset value N, added the scanned number by 1.

3. The method of claim 2, further comprising:
   comparing the daily list with the contact list to determine whether a device recording in the contact list is recorded in the daily list; and
   when the device recording in the contact list is recorded in the daily list, sending a warning message to the electronic device and the server.

4. The method of claim 3, wherein the temporary list and the contact list are stored in the electronic device.

5. An electronic device, comprising:
   a Bluetooth module, configured to scan surrounding devices via Bluetooth by a preset time interval, in response that a device is scanned, request a device name and an IMSI of the scanned device, and generate a surrounding phone list according to the scanned device; and
   a processing module, configured to compare the surrounding phone list with a daily list to determine whether the scanned device recording in the surrounding phone list is recorded in the daily list, and, when the scanned device recording in the surrounding phone list is recorded in the daily list, send a warning message to the electronic device and a server; when the scanned device recording in the surrounding phone list is not recorded in the daily list, compare the surrounding phone list with a temporary list to determine whether the scanned device recording in the surrounding phone list is recorded in the temporary list; and when the scanned device recording in the surrounding phone list is not recorded in the temporary list, store the IMSI of the scanned device in the temporary list.

6. The device of claim 5, wherein the processing module is configured to, when the scanned device recording in the surrounding phone list is recorded in the temporary list, determine whether a scanned number of the scanned device is less than a preset value N indicating the lowest scanned times, when the scanned number is not less than the preset value N, record the scanned device in a contact list, and, when the scanned number is less than the preset value N, adds the scanned number by 1.

7. The device of claim 6, wherein the processing module is configured to compare the daily list with the contact list to determine whether a device recording in the contact list is recorded in the daily list, and, when the device recording in the contact list is recorded in the daily list, send a warning message to the electronic device and the server.

8. The device of claim 7, wherein the temporary list and the contact list are stored in the electronic device.

9. A computer program product comprising at least one non-transitory computer-readable medium having computer-readable program code portions embodied therein, the computer-readable program code portions comprising:
   an executable portion configured to scan surrounding devices via Bluetooth by a preset time interval;
   an executable portion configured to, in response that a device is scanned, request a device name and an IMSI of the scanned device, and generate a surrounding phone list according to the scanned device;
   an executable portion configured to compare the surrounding phone list with a daily list to determine whether the scanned device recording in the surrounding phone list is recorded in the daily list; and
   an executable portion configured to, when the scanned device recording in the surrounding phone list is recorded in the daily list, send a warning message to the electronic device and a server; when the scanned device recording in the surrounding phone list is not recorded in the daily list, compare the surrounding phone list with a temporary list to determine whether the scanned device recording in the surrounding phone list is recorded in the temporary list; and when the scanned device recording in the surrounding phone list is not recorded in the temporary list, store the IMSI of the scanned device in the temporary list.

10. The computer program product of claim 9, further comprising:
- an executable portion configured to, when the scanned device recording in the surrounding phone list is recorded in the temporary list, determine whether a scanned number of the scanned device is less than a preset value N indicating the lowest scanned times;
- an executable portion configured to, when the scanned number is not less than the preset value N, record the scanned device in a contact list; and
- an executable portion configured to, when the scanned number is less than the preset value N, add the scanned number by 1.

11. The computer program product of claim 10, further comprising:
- an executable portion configured to, compare the daily list with the contact list to determine whether a device recording in the contact list is recorded in the daily list; and
- an executable portion configured to, when the device recording in the contact list is recorded in the daily list, send a warning message to the electronic device and the server.

* * * * *